United States Patent [19]
Hernandez et al.

[11] Patent Number: 5,755,510
[45] Date of Patent: May 26, 1998

[54] FAST BICHROMATIC PYROMETER FOR USE WITH AN OPTICAL FIBER

[75] Inventors: Daniel Hernandez; Gabriel Olalde, both of Odeillo; Emmanuel Milcent, Odeillo Cedex; Michel Clement, Vernon, all of France

[73] Assignee: Societe Europeenne de Propulsionm, Suresnes, France

[21] Appl. No.: 546,454

[22] Filed: Oct. 20, 1995

[30] Foreign Application Priority Data

Oct. 21, 1994 [FR] France .................. 94 12588

[51] Int. Cl.⁶ ............................................ G01J 5/08
[52] U.S. Cl. .............................. 374/121; 73/866.5
[58] Field of Search .......................... 374/121, 127, 374/128; 73/866.5, 23.2

[56] References Cited

U.S. PATENT DOCUMENTS

| | | | |
|---|---|---|---|
| 3,922,550 | 11/1975 | Crowley et al. | 374/128 |
| 3,992,943 | 11/1976 | Schiefer et al. | 374/128 |
| 4,326,798 | 4/1982 | Kohn . | |
| 4,764,025 | 8/1988 | Jensen . | |
| 5,188,458 | 2/1993 | Thompson et al. | 374/128 |
| 5,318,362 | 6/1994 | Schietinger et al. | 374/128 |
| 5,326,171 | 7/1994 | Thompson et al. . | |
| 5,507,576 | 4/1996 | Fally . | |

FOREIGN PATENT DOCUMENTS

| | | |
|---|---|---|
| 0216458 | 4/1987 | European Pat. Off. . |
| 0425229 | 5/1991 | European Pat. Off. . |
| 4028408 | 3/1992 | Germany . |
| 2068109 | 8/1981 | United Kingdom . |
| 2160971 | 1/1986 | United Kingdom . |
| 2257508 | 1/1993 | United Kingdom . |
| 9103715 | 3/1991 | WIPO . |

Primary Examiner—Ronald L. Biegel
Attorney, Agent, or Firm—Weingarten, Schurgin, Gagenbin, & Hayes LLP

[57] ABSTRACT

The present invention relates to a fast bichromatic pyrometer for measuring the temperature T of a gas or of a moving surface, the pyrometer comprising: a measurement probe placed facing the surface or immersed in the gas and picking up thermal radiation that is characteristic of the temperature of said surface or of said gas; a single optical fiber connected to the measurement probe and transmitting said radiation; an optical block connected to the optical fiber and receiving said radiation, the optical block including inlet collimation means for transmitting all of said radiation, separation means formed by a dichroic slide for separating the transmitted radiation into two distinct spectral bands, and outlet focusing means for concentrating the two separated bands of radiation; a quantum detection circuit receiving said separated bands of radiation and converting them into two color voltages Vr, Vb; and a treatment circuit receiving the voltage signals and including analog-to-digital conversion means, a digital signal processor for calculating the ratio Vr/Vb from these digital values, and memory means provided with a table of predetermined values of $T=f(Vr/Vb)$ as obtained by calibration and delivering at its output, on the basis of the calculated ratio, the temperature T of the surface or of the gas.

36 Claims, 7 Drawing Sheets

FAST BICHROMATIC PYROMETER FOR USE WITH AN OPTICAL FIBER

FIELD OF THE INVENTION

The present invention relates to a pyrometer enabling temperature measurements to be performed in a severe environment (measuring gas temperatures or the temperatures of moving surfaces), with measurement being performed very fast.

PRIOR ART

Such extreme environmental conditions are present, in particular, when measuring the speeds of rotation of turbines in operation, such as industrial turbomachines, helicopter turbines, turbojets, or turbopumps for feeding the cyrogenic engines of rockets, for example. In such cases, only optical measurement is capable of analyzing the thermal behavior of such turbines as finely as possible and of providing accurate knowledge about the mechanical properties of the materials and the way in which they vary as a function of temperature. The article by Sam Walters entitled "New instrumentation for advanced turbine research" published in the journal Mechanical Engineering, February 1983 (Vol. 105, No. 2) describes the problems posed by such measurements very exactly and it gives a good overview of solutions that are presently available.

Nevertheless, those solutions still suffer from certain drawbacks. In particular, measurement errors associated with optical transmission problems may exist in devices that use a monochromatic optical fiber for capturing and transporting the thermal radiation emitted by the moving turbine. In bichromatic measurement devices in which it is necessary to separate the light beam on leaving its transport fiber, it is conventional to make use of a separator cube because it presents a high degree of homogeneity with the fiber. Nevertheless, such a cube is particularly sensitive to vibration and to possible shock, and the distribution of light flux at its outlet can be modified thereby. More simply, chromatic aberrations may appear when the output beam from the fiber is poorly collimated.

Also, in such bichromatic devices, the signals coming from the separation means are generally treated in real time in analog form using conventional discrete components. This gives rise to long response times (of millisecond order), and when performing measurements at high frequencies this gives rise to operating constraints that are particularly significant. Thus, stabilizing the measurement device requires the passband to be limited and consequently puts a limit on its overall measurement rate (speed). Similarly, because of its structure, such a device remains sensitive to any phenomena of voltage or temperature drift, and eliminating such drift can only be undertaken at the cost of frequent and awkward adjustments.

Finally, the combination of the separator cube optical system and the above-mentioned analog electronic unit does not give rise to a device which is miniaturized, even though such miniaturization is necessary in on-board systems where it would be useful in specifying the operating limits of turbomotors, and in particular for monitoring transient operating conditions.

OBJECT AND SUMMARY OF THE INVENTION

The present invention seeks to mitigate the above-specified drawbacks and to propose a pyrometer that is particularly compact and suitable for fast detection rates so as to enable it to perform instantaneous temperature measurements continuously over a wide range of temperatures, and in particular the temperatures of turbine blades in rotation.

These objects are achieved with a fast bichromatic pyrometer for measuring the temperature T of a gas or of a moving surface, and comprising:
- a measurement probe placed facing the surface or immersed in the gas and picking up thermal radiation that is characteristic of the temperature of said surface or of said gas;
- a single optical fiber connected to the measurement probe and transmitting said radiation;
- an optical block connected to the optical fiber and receiving said radiation, the optical block including inlet collimation means for transmitting all of said radiation, separation means formed by a dichroic slide for separating the transmitted radiation into two distinct spectral bands, and outlet focusing means for concentrating the two separated bands of radiation;
- a quantum detection circuit receiving said separated bands of radiation and converting them into two color voltages Vr, Vb; and
- a treatment circuit receiving the voltage signals and including analog-to-digital conversion means, a digital signal processor for calculating the ratio Vr/Vb from these digital values, and memory means provided with a table of predetermined values of T=f(Vr/Vb) as obtained by calibration and delivering at its output, on the basis of the calculated ratio, the temperature T of the surface or of the gas.

The above-defined structure gives rise to a pyrometer that is particularly compact, by using a dichroic slide as the separator device, and fast, by using a signal processor in combination with a fast memory containing a pre-established conversion table, making it possible, in particular to measure the instantaneous temperature of turbine blades in rotation.

In certain applications, it is not essential to perform measurement remotely, and the measurement may be performed directly from the optical block which can then advantageously be provided with means for focusing the radiation emitted by the surface.

Measurements may be performed over broad spectral bands all the way down to monochromatic ranges, where it is necessary for each of the outlet focusing means for the separated radiation to be preceded by interference filtering means.

The focusing means preferably include achromatic doublets.

The treatment circuit also includes means for fast conversion of the values Vr and Vb in order to estimate their orders of magnitude. These means comprise two analog-to-digital converters of the flash type. The circuit also includes means for matching the amplification levels of the signals Vr and Vb as a function of the orders of magnitude supplied to the processor by the fast converters. For each signal Vr or Vb, these means comprise a multiplexer circuit having one input path and at least two output paths, receiving the signal and delivering it to one of at least two amplifier circuits of different gains whose outputs are connected to a demultiplexer circuit having at least two input paths and one output path, only one of the amplification circuits being selected for each calculation of the ratio Vr/Vb. The treatment circuit may also include digital-to-analog conversion means placed at the output from the signal processor and serving to provide an analog value of the measured temperature.

The detection circuit includes two quantum detectors of the InGaAs type. These detectors transform the radiation they receive into an electrical current proportional to the power of the radiation.

The memory means comprise a fast memory of the flash type which is well adapted to a digital signal processor (DSP).

When the desired measurement rates are not particularly high, the digital treatment circuit may be replaced by a circuit including an analog divider which receives the signals Vr and Vb and which delivers the ratio Vr/Vb to an analog-to-digital converter whose output is connected to a memory circuit that contains a table of values of T=f(Vr/Vb), and that delivers the measured temperature T.

The measurement probe includes a sapphire bar covered in a fine protective layer and whose end facing the fiber includes a spherical cap focusing nearly all of the emitted radiation into the fiber. The other end of the measurement probe receiving the radiation may include a hemispherical cap whose radius is determined as a function of the distance to the surface.

In the special case of measuring gases, the end of the measurement probe is covered in a coating that imparts black body type thermal emissivity thereto. The coating is constituted by a first layer that is highly emissive and by a second layer that is opaque to light and highly conductive. It may also have an intermediate layer placed between the first and second layers and optimizing heat diffusion and making the temperature uniform. In addition to optimizing emission and heat transfer, these layers also provide thermomechanical and chemical protection to the probe as a function of its environment (a reducing medium or an oxidizing medium).

The present invention also provides a method of measuring the temperature of a gas or of a surface in motion by determining and treating a thermal radiation characteristic of said surface or of said gas, the method comprising the following steps:

1) picking up thermal radiation characteristic of the temperature of the surface or of the gas;
2) separating said radiation into two distinct spectrum bands of radiation;
3) converting the two bands of radiation into two color voltages Vr and Vb;
4) calculating the ratio thereof Vr/Vb; and
5) extracting the corresponding value of the measured temperature T from a conversion table T=f(Vr/Vb) that has previously been determined by calibration.

Preferably, in order to facilitate temperature determination, the step of calculating the ratio Vr/Vb is preceded by a step of reducing the dynamic range of the signals Vr and Vb, which step consists in matching the gain of an amplification circuit to said signals as a function of their orders of magnitude.

BRIEF DESCRIPTION OF THE DRAWINGS

Other characteristics and advantages of the present invention appear better from the following description given by way of non-limiting indicating, and with reference to the accompanying drawings, in which.

DETAILED DESCRIPTION OF EMBODIMENTS

Figure 1:
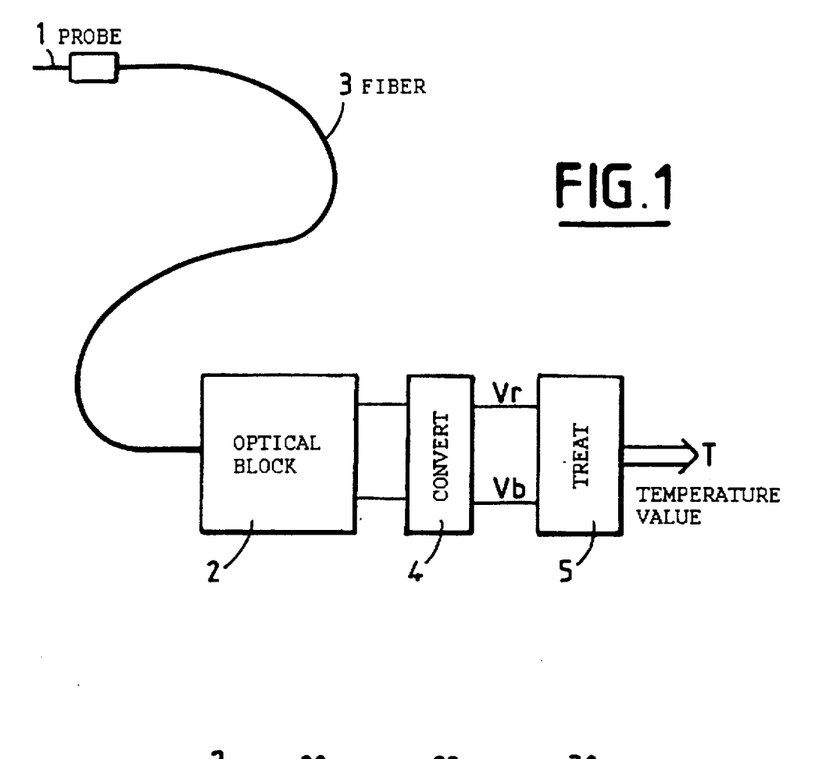
FIG. 1 is a block diagram of a fast pyrometer of the invention.

The pyrometer of the invention is shown diagrammatically in FIG. 1. It comprises an optical sensor or probe 1 placed facing a hot body or in a gaseous medium, whose temperature is to be measured, and it is connected to an optical block 2 via a single optical fiber 3. A detection circuit placed at the output from the optical block, or preferably integrated in the block, serves to convert the optical signals and to deliver them as electrical signals usable by a treatment unit 5 (optionally after conversion and matching by a conversion circuit 4), which teatment unit then generates the value of the looked-for temperature.

The configuration of the pyrometer shown is bichromatic, i.e. the thermal radiation emitted by the surface of the hot body or by the gas (in which case the measurement probe has a coating that acts as a micro black body) is measured in two distinct spectral bands. It is thus possible to limit causes of error that correspond to losses in transmission and in coupling of the radiation (bends, connections, dirt) which directly affect the measurement when performing monochromatic analysis. However, a bichromatic structure requires the radiation leaving the fiber to be separated into two portions. That is the purpose of the optical block 2 whose hardware structure is described below in greater detail with reference to FIG. 2a.

Figure 2A:
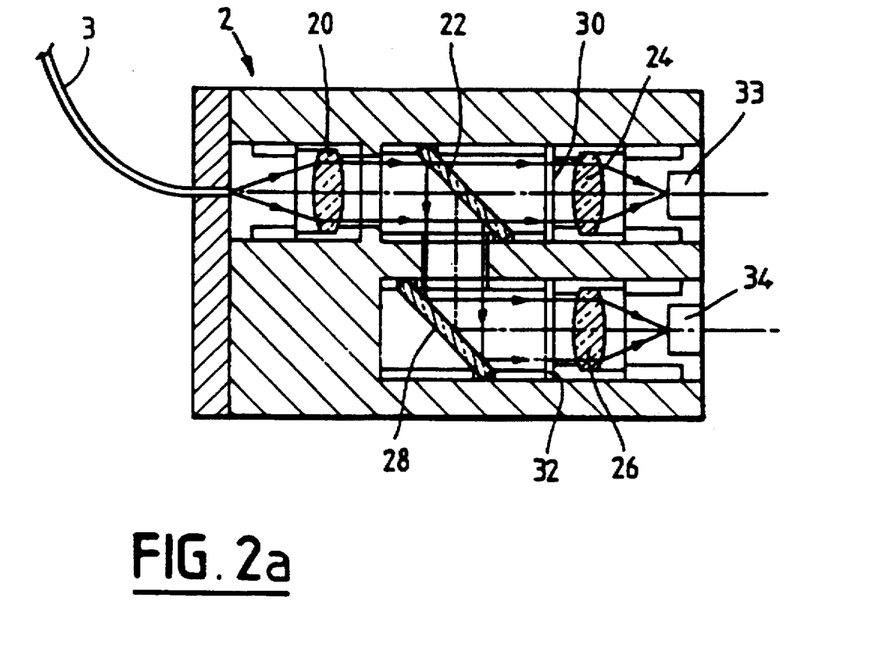
FIGS. 2a and 2b show two implementations of the optical block used in the FIG. 1 pyrometer.

The optical block 2 has inlet collimation means 20 at its inlet for transmitting the radiation from the fiber 3 in parallel form to means for separating the beam into two portions, which means are constituted by a dichroic slide 22 that acts as a highpass filter in transmission and as a lowpass filter in reflection. The beams coming from the slide are then directed either directly or via a mirror 28 to spectral selection means (red or blue spectra) comprising interference filters 30 and 32. Outlet focusing means 24 and 26 placed at the outlets of the filters serve to concentrate the separated beams onto quantum detectors 33 and 34 which are preferably made of indium and gallium arsenide (InGaAs). The optical block made in this way is particularly compact and provides high performance. Firstly the signal levels available at the inlets of the quantum detectors (photovoltaic detectors) are greater than the signal levels that can be picked up at the outlet from a separator cube, and secondly the dichroic slide is insensitive to polarization and does not give rise to aberrations in the event of unwanted convergence of the radiation. Compared with a separator cube device, the increase in light flux leaving the slide is 100%. It is thus possible either to use a fiber of smaller diameter for measuring a given temperature, or else to extend the range of measured temperatures, in particular at the low temperature end. It may be observed that when performing measurements over a broad spectral band (300 nanometers (nm) to 400 nm), the interference filters 30 and 32 may advantageously be omitted. It may also be observed that using achromatic optical doublets for the focusing means makes it possible to obtain optimum spatial resolution thus making it possible to use detectors of small surface area.

Figure 2B:
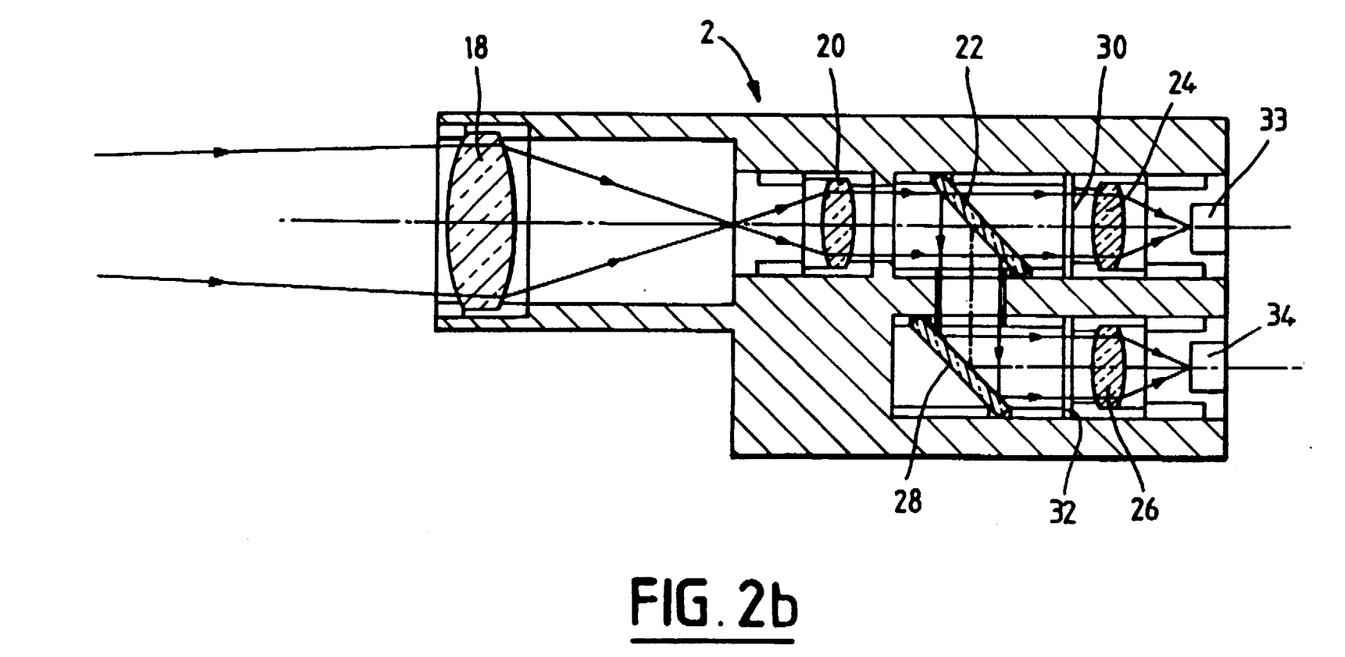

FIG. 2b shows a second embodiment of the optical block. It may be observed that in some applications where there is no need for measurement to be performed remotely, the measurement can be performed directly from the optical block 2 by providing it with means enabling it to take a pyrometric observation directly. These means comprise inlet focusing means 18 which pick up the radiation and focus it on the focus of the inlet collimation means 20, the light flux then being directed, as before, to the separation means 22 and terminating on the detectors 33 and 34.

The electrical currents delivered by the photo-voltaic detectors are transformed into voltages and normalized in the current-voltage conversion circuit 4 which, in order to improve the signal/noise ratio, may advantageously be integrated in the optical block.

The color voltages delivered by this circuit on each of two measurement paths are referenced Vr (red voltage) and Vb (blue voltage).

Figure 3:
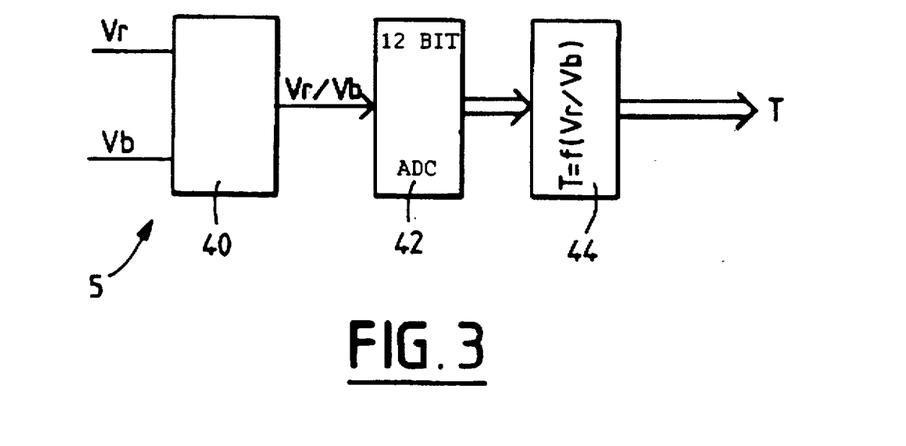
FIG. 3 shows a first embodiment of a signal treatment unit implemented in the pyrometer of FIG. 1.
Figure 4:
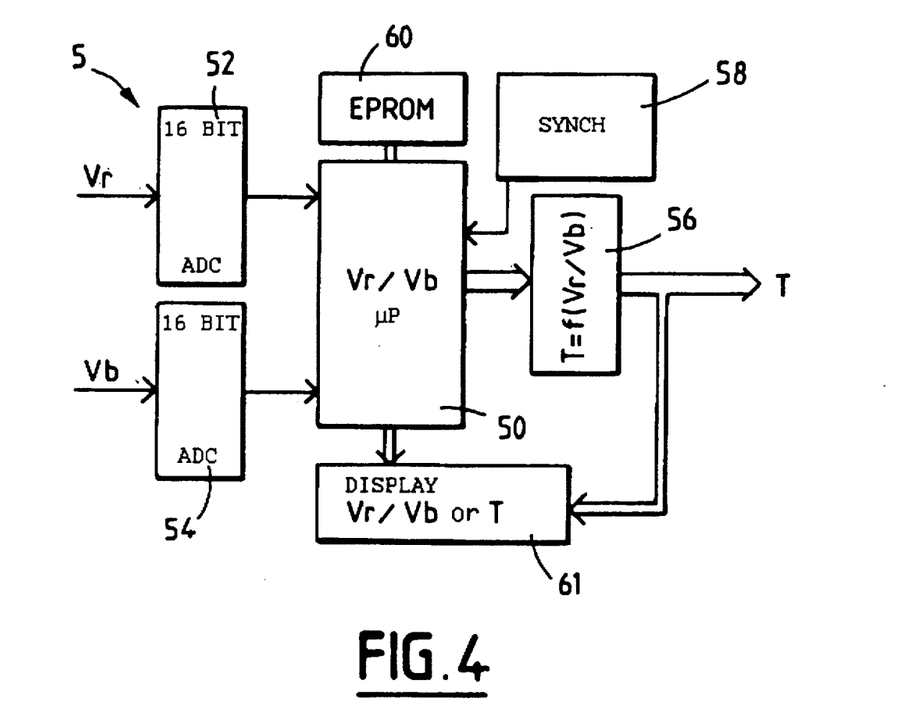
FIG. 4 shows a second embodiment of the signal treatment unit implemented in the pyrometer of FIG. 1.
Figure 5:
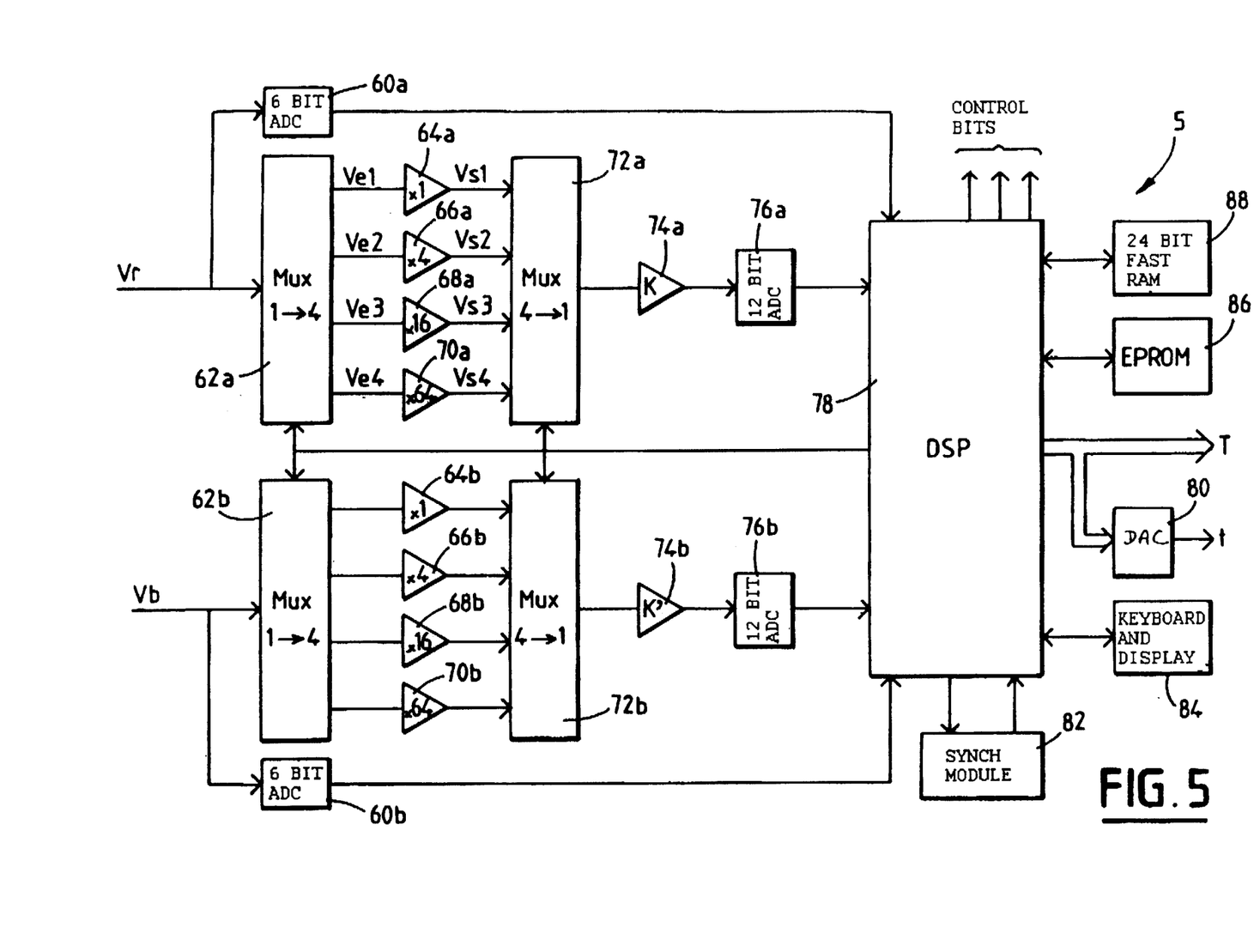
FIG. 5 shows a preferred embodiment of the signal treatment unit implemented in the pyrometer of FIG. 1.

The treatment of the signals Vr and Vb from which the temperature T to be measured is determined, is itself performed in the treatment circuit 5, various embodiments of which are shown in FIGS. 3 to 5.

In FIG. 3, both the analog and the digital architecture of the circuit is simplified, and the circuit is particularly suitable for use at low measurement rates (of the order of 1,000 measurements per second). The voltages Vr and Vb are applied to an analog divider 40 which finds the ratio Vr/Vb and delivers it to an analog-to-digital converter 42 whose output is connected to a memory circuit 44 containing a conversion table T=f(Vr/Vb) and delivering the value of the temperature T which corresponds to the ratio as calculated at the output from the converter.

In contrast, in FIG. 4, the treatment circuit is completely digital in architecture organized around a microprocessor digital calculation unit 50 which receives the voltages Vr and Vb from the detectors and digitized by analog-to-digital converters 52 and 54, and which calculates a digital value equal to the ratio of Vr/Vb which it delivers to memory means 56 from which the measured temperature T is extracted directly, as above. A synchronization module 58 connected to the calculation unit 50 triggers the measurement process under the control of software stored in a read-only memory 60 that is advantageously programmable and erasable (EPROM). A display module 62 serves to display the temperature T, and also the ratio Vr/Vb.

In order to make very fast measurement rates possible (up to 110,000 measurements per second), the converters have a resolution of 16 bits and a conversion time of microsecond order. The ratio Vr/Vb is calculated in real time by the digital calculation unit 50 and is used as a pointer to extract the value of the temperature from the memory means which, as before, include a table of values (a conversion table) giving the temperature T for each ratio of Vr/Vb.

With the bichromatic pyrometer of the invention, the value of the temperature is given by the following formula:

$$T = A/(\log(Vr/Vb) + B)$$

where Vr and Vb are the two color voltages (red and blue) delivered by the detectors, and A and B are two constants determined by prior calibration.

Although calculating T in real time from Vr and Vb does not present any special difficulties at low measurement rates, and can be implemented using conventional analog or digital technology, it becomes a real problem when it is necessary to operate at higher rates. Analog techniques become very complex for response times faster than 1 ms, requiring the use of special circuits which turn out to be very sensitive in use. With digital techniques, calculating a logarithm or performing a plurality of divisions requires significant execution time which is incompatible with very high measurement rates.

The present invention has solved this problem by making use of a conversion table T=f(Vr/Vb) that contains a set of previously determined values and that is updated for each change in the constants A and B as obtained during calibration. Although the signals Vr and Vb vary greatly, the ratio Vr/Vb remains, on the contrary, within a rather narrow range that is easily covered in full with a conversion table of reasonable size. Thus, by taking all of the values for the ratio Vr/Vb lying in the range 0.3 to 2.6 in steps of $10^{-3}$, a table is obtained having the ratio Vr/Vb as its input variable and having the temperature T as its output variable, which table can be stored in a memory of 2,048 words. The process of temperature measurement then reduces merely to calculating the ratio of the color voltages Vr/Vb and then pointing into a memory containing said conversion table for the corresponding temperature value. Naturally this original solution may also be used at lower rates as shown in the embodiment of FIG. 3.

The ratio Vr/Vb is calculated in the calculation unit 50 which advantageously includes a circuit that is specialized in treating digital signals, such as a digital signal processor (DSP) for example, and suitable for performing operations on 48 bits or even on 56 bits.

FIG. 5 shows a preferred embodiment of the treatment circuit 5. Each of the signals Vr and Vb from the two measurement paths as delivered by the detector circuits 33 and 34 constitutes an input signal both for a respective fast analog-to-digital converter 60a or 60b, and for a respective multiplexer circuit 62a or 62b having a single input path and at least two (and advantageously four) output paths, with each of the multiplexer outputs being connected to a respective amplifier circuit 64a, 66a, 68a, 70a or 64b, 66b, 68b, 70b, with each amplifier circuit having a different amplification factor (gain), preferably chosen to have the following ratios: 1, 4, 16, and 64. The signals delivered by the amplification circuits are applied to two corresponding multiplexer circuits 72a or 74b each having at least two (and preferably four) inputs and one output, which output is connected to a respective level matching circuit 74a or 74b which delivers an input voltage to a corresponding analog-to-digital converter 76a or 76b. The outputs from the two converters are connected to a digital calculation unit, constituted by a signal processor 78 which manages and controls all of the circuits in the treatment circuit and which generates the digital value T of the measured temperature. A digital-to-analog converter 80 may optionally be used to provide said temperature in analog form. The treatment circuit 5 also includes, connected to the processor 78: a synchronization module 82; a data input and output unit (in the form of a keyboard and a display) 84; a read-only memory 86; and a fast random access memory (of the flash type) 88.

The measurement process is triggered by the synchronization module 82 under the control of management software stored in the read-only memory 86 which is advantageously both programmable and erasable (EPROM). The process begins with conversion that is fast but approximate, e.g. on 6 bits only, as performed by the fast converters 60a and 60b in order to estimate the orders of magnitude of the color voltages Vr and Vb. On the basis of the values obtained, the processor 78 determines the most appropriate gain (1, 4, 16, or 64) on each of the two measurement paths (this determination is performed in real time for each measurement point), thereby reducing the dynamic range of the signals. The matching stage 74a, 74b serves to calibrate the signals delivered by the selected amplification circuits so as to benefit from the full resolution of the analog-to-digital converter 76a or 76b which preferably performs conversion on at least 12 bits. The digitized values of Vr and Vb are used for calculating the ratio Vr/Vb in the arithmetic and logic treatment unit of the processor 78.

Figure 6:
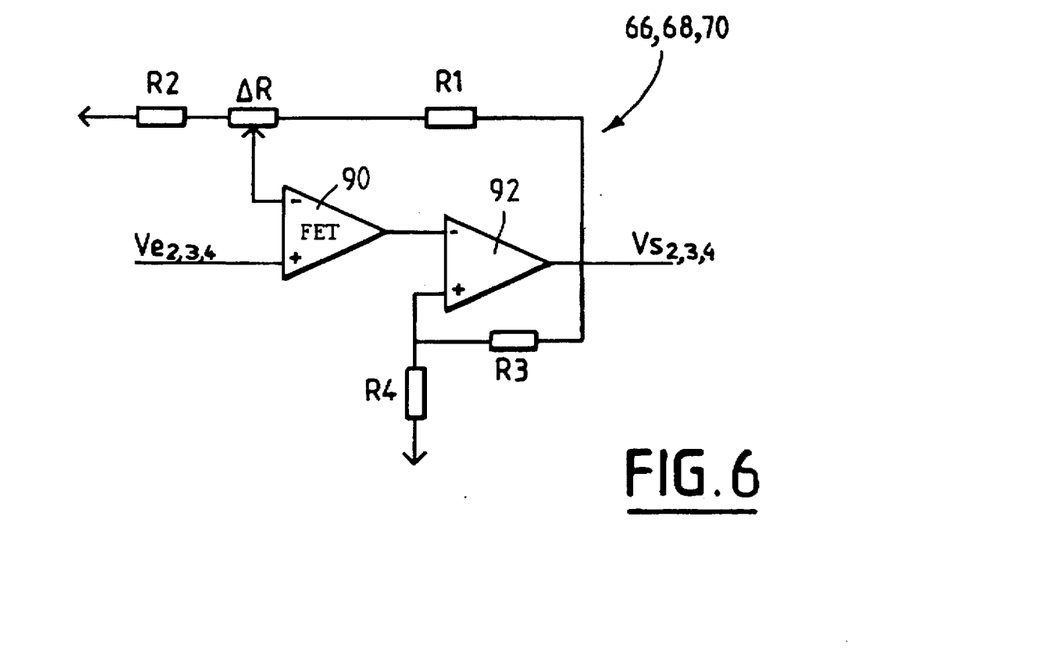
FIG. 6 shows a first implementation detail of the FIG. 5 unit.

An embodiment of amplifier circuits of gain 4, 16, or 64 is shown in FIG. 6, it being understood that the unity gain amplification circuit is conventionally implemented as a simple operational amplifier connected at a voltage follower. The input stage is constituted by an operational amplifier having field effect transistors (FETs) 90 that makes it possible to obtain an offset current that is very small and that varies little with temperature. The small passband and low maximum slew rate of the output voltage of the FET amplifier is compensated by the presence at its output of a second operational amplifier 92 that uses bipolar transistors and which, on the contrary, has a passband and a slew rate that are both very high. The signal Ve from the multiplexer circuit 62a or 62b is applied to the non-inverting input of the first amplifier 90, while its inverting input is connected to the midpoint of an adjustable potentiometer ΔR whose two ends are connected respectively to one end of a first resistor R1 whose other end is connected to the output of the second amplifier 92, and to one end of a second resistor R2 whose other end is connected to a positive reference potential. The output of the first amplifier constitutes the inverting input of the second amplifier whose non-inverting input is looped to the output of said second amplifier via a third resistor R3 and is connected to a negative reference potential via a fourth resistor R4. By selecting the resistance ratio R3/R4 to be equal to the resistance ratio R1/R2, the gain of the amplifier unit is given merely by the ratio R1/R2.

Figure 7:
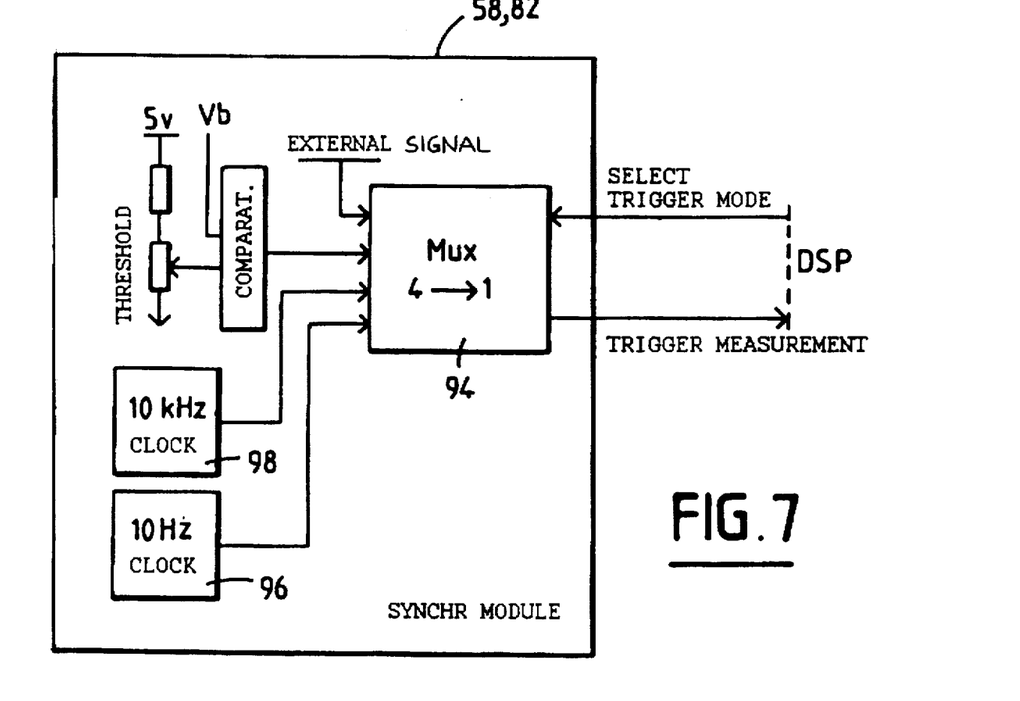
FIG. 7 shows a second implementation detail of the FIG. 5 unit.

The synchronization module 58, 82 for triggering the measurement process by activating the corresponding interrupt of the processor 50, 78 is shown in FIG. 7. This module includes a multiplexer circuit 94 having four inputs and one output, its input being connected to receive: an external signal; the output signals from two clock circuits 96 and 98 at frequencies of 10 Hz and 10 kHz; and the output signal from a comparator 99 which has one input connected to receive the signal Vb and another input connected to receive a predetermined threshold voltage. A particular one of these signals is selected from the signal processor 78 which thereby generates four distinct synchronization modes: a slow mode for calibration during which the constants A and B and the values of Vr and Vb are input manually via the keyboard (in this mode, the measurement frequency is advantageously a few Hz, e.g. 10 Hz, and the passband on each path is therefore limited), and three fast modes that differ in the way in which measurement is triggered. In an externally-synchronized mode, temperature calculation is triggered by an external logic signal, with this calculation being possible at rates of up to 110,000 times per second. In an internally-synchronized mode, calculation is triggered by the signal Vb whenever it exceeds the predetermined voltage threshold. In a fixed frequency synchronization mode, calculation is triggered 10,000 times per second. Naturally, the various frequencies mentioned above are given purely as an indication and it is possible to modify them so as to adapt the pyrometer of the invention to a very wide range of situations. For example, the pyrometer is capable of characterizing phenomena having natural periodicity (e.g. turbine blades) as well as processes having variations that, a priori, may be arbitrary.

Figure 8:
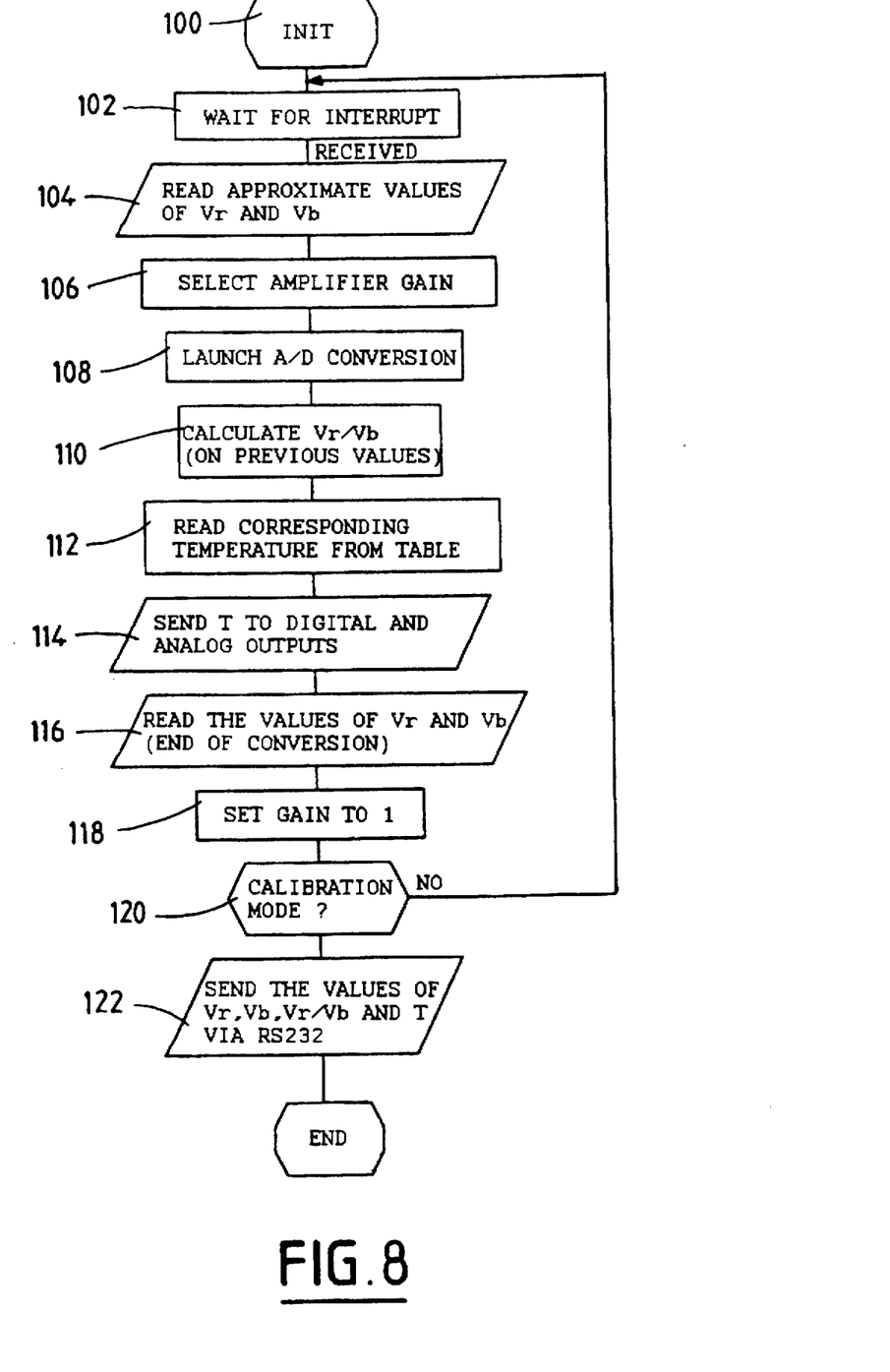
FIG. 8 is a flow chart showing how the signal treatment unit of FIG. 5 operates.

The various steps of calculating temperature from the color voltages Vr and Vb are now described with reference to FIG. 8.

After initialization performed in a first step 100, the processor waits, in a step 102, for an interrupt signal which may be generated by the synchronization module 82 (when calculating temperature) or by the circuit 84 for controlling the display and keyboard (during calibration).

When an interrupt is received from the synchronization module, the processor, in a step 104, reads the voltage values Vr and Vb as delivered by the fast converters 60a and 60b, and then, in a step 106, it selects the gain that is most appropriate for analog-to-digital conversion which it launches in a step 108. In parallel, in a step 110, it calculates the ratio Vr/Vb (on the values obtained from the preceding conversion). In the following step 112, it reads the corresponding temperature value from the conversion table, and in step 114 this value T is applied to a digital output or is sent to the converter 80 which delivers the equivalent analog signal t on its output. At the end of conversion, in step 116, the values Vr and Vb are read by the processor and saved for the forthcoming calculation, and the gain is reset to 1 during the following step 118. Depending on the operating mode selected in step 120 (calculation mode or calibration mode) the process either returns to the initial wait state (step 102) or else sends the values of T and of Vr/Vb to the display control circuit 84.

Otherwise, if the interrupt comes from the keyboard control circuit 84, then the input message is analyzed and the corresponding operation is then performed. This may be a change in mode or it may be calibration with modified parameters A and B. Once this action has been completed, the processor returns to its initial state of waiting for a new interrupt from the keyboard or from the synchronization module.

Figure 9:
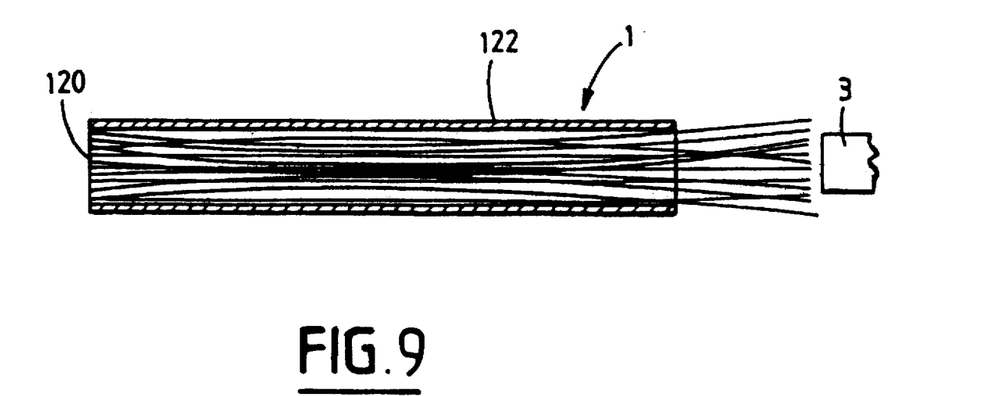
FIGS. 9 and 10 show embodiments of probes suitable for use in the FIG. 1 pyrometer.
Figure 10:
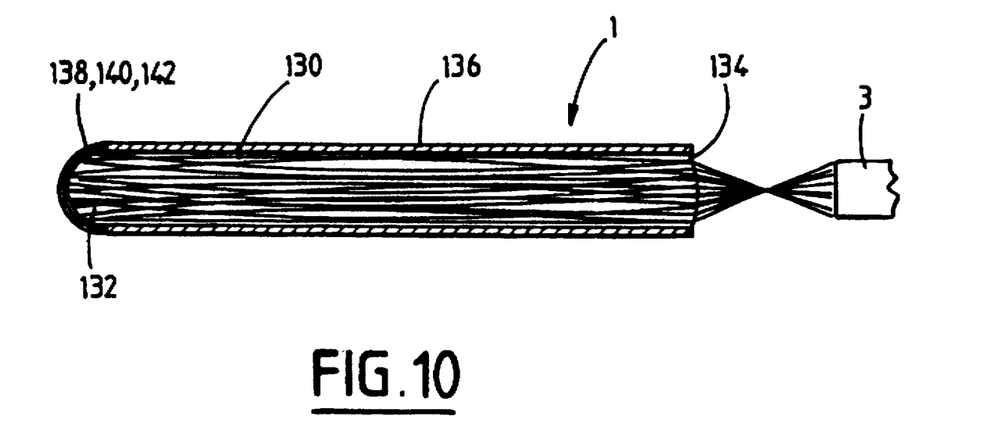

FIGS. 9 and 10 show two possible architectures for the measurement probe 1. These probes are simple in design and use a conventional optical fiber 120 without any focusing device, the fiber then being placed to look at the surface whose temperature is to be measured, which surface may be brought to temperature merely by displacement of a gas flowing over it. Such a fiber may be a step index multimode silica/silica fiber (core/cladding). The fiber is transparent and advantageously covered in a thin layer 122 of opaque material which provides it with thermal protection and mechanical protection that are sufficient but that are specific to each application (by depositing a refractory material by means of a plasma, for example). The probe fiber is connected to the transmission fiber 3 by a coupling that is not shown. In a more elaborate version, the probe is constituted by a cylindrical sapphire rod 130 whose face exposed to the radiation may be made in the form of a hemispherical cap 132 whose radius is set in determined manner as a function of the intended application. Naturally, a face that is merely perpendicular could also be envisaged. The outlet face of the sapphire facing the fiber is advantageously made in the form of a spherical cap 134 enabling substantially all of the flux that is to be conveyed by the fiber 3 to be focused (maximizing optical coupling with the fiber). Given the small number of parts involved, this solution is particularly reliable since it avoids the use of a lens, which is always difficult to position. The solution also has the advantage of low cost and the advantage of conserving the intrinsic qualities of the sapphire bar. As before, the outside surface of the bar includes thermal and mechanical protection 136.

In addition, in the version shown in FIG. 10, which is intended for measuring gas and more particularly at high temperature, the hemispherical cap 132 is covered in various layers having the purpose of creating a coating at the free end of the sapphire which confers black body type thermal emission thereto. These layers have a total thickness that does not exceed 10 µm to 15 µm (in particular to ensure good time response) and they optimize not only emission and transfer of heat, but also the thermomechanical and chemical behavior of the probe as a function of its environment (reducing or oxidizing medium). Each layer has a particular function: a highly emissive first layer 138; and a second layer 142 that is opaque and highly conductive. Two layers suffice, however an intermediate layer 140 may be added to optimize heat diffusion, thereby causing temperature to be uniform.

The fast bichromatic pyrometer of the invention can be used in all stages of developing and operating turbomotors:

during the development stage, it can be used to measure blade temperatures, e.g. for the purpose of studying interchanges between the gas and the turbine, or various cooling methods; and during an operating stage, the detection of anomalies is made easier by accurately following variations in temperature.

Its speed also predisposes it for use in numerous leading edge technologies. For example, measuring rapidly moving particles in gas flows such as fluidized beds or plasma jets. Another example consists in the treatment of surfaces by very short pulses of irradiation using intense beams (laser, concentrated solar radiation, . . . ).

The pyrometer can thus make it possible to discover very full experimental data concerning phenomena that so far have been studied little since they are beyond the reach of conventional instrumentation.

What is claimed is:

1. A fast bichromatic pyrometer for measuring the temperature T of a gas of a moving surface, the pyrometer comprising:

a measurement probe placed facing the surface or immersed, in the gas and picking up thermal radiation that is characteristic of the temperature of said surface or of said gas;

a single optical fiber connected to the measurement probe and transmitting said radiation;

an optical block connected to the optical fiber and receiving said radiation, the optical block including inlet collimation means for transmitting all of said radiation, separation means formed by dichroic slide for separating the transmitted radiation into two distinct spectral bands, and outlet focusing means for concentrating the two separated bands of radiation;

a quantum detection circuit receiving said separated bands of radiation and converting them into two color voltages Vr, Vb;

converging means for approximating said color voltages Vr, Vb to substantially estimate the magnitude of said color voltages; and a treatment circuit receiving the voltage signals and including analog-to-digital conversion means, a digital signal processor for calculating the ratio Vr/Vb from these digital values, and memory means provided with a table or predetermined values T=f(Vr/Vb) as obtained by calibration and delivering at its output, on the basis of the calculated ratio, the temperature T of the surface or of the gas.

2. A fast bichromatic pyrometer according to claim 1, wherein each of the outlet focusing means for the separated bands of radiation is preceded by interference filter means.

3. A fast bichromatic pyrometer according to claim 1, wherein the focusing means comprise achromatic doublets.

4. A fast bichromatic pyrometer according to claim 1, wherein the fast conversion means comprise two flash type analog-to-digital converters.

5. A fast bichromatic pyrometer according to claim 1, wherein the treatment circuit further includes means for matching the amplification levels of the signals Vr and Vb as a function of the orders of magnitude delivered to the processor by the fast converters.

6. A fast bichromatic pyrometer according to claim 5, wherein the means for adapting the amplification levels comprise, for each signal Vr or Vb, a multiplexer circuit having one input and at least two outputs receiving the signal and delivering it to one of at least two amplification circuits of different gains whose outputs are connected to a multiplexer circuit having at least two inputs and one output, a single amplification circuit being selected for each of the signals for each calculation of the ratio Vr/Vb.

7. A fast bichromatic pyrometer according to claim 1, wherein the treatment circuit further includes digital-to-analog conversion means placed at the output from the signal processor and designed to obtain an analog value of the measured temperature.

8. A fast bichromatic pyrometer according to claim 1, wherein the detection circuit includes two quantum detectors of the InGaAs type.

9. A fast bichromatic pyrometer according to claim 1, wherein the memory means comprise a flash type fast memory.

10. A fast bichromatic pyrometer according to claim 1, wherein the measurement probe comprises a sapphire bar covered in a fine protective layer and whose end facing the fiber includes a spherical cap focusing substantially all of the emitted radiation into the fiber.

11. A fast bichromatic pyrometer according to claim 1, wherein the end of the measurement probe that receives radiation from the surface includes a hemispherical cap whose radius is determined as a function of the distance to the surface.

12. A fast bichromatic pyrometer according to claim 11, more particularly intended for measuring the temperature of gases, wherein the end of the measurement probe that receives the radiation is covered in a coating which confers black body type thermal emission thereto.

13. A fast bichromatic pyrometer according to claim 12, wherein said coating is constituted by a first layer that is highly emissive and by a second layer that is opaque to light and that is highly conductive.

14. A fast bichromatic pyrometer according to claim 13, wherein the coating further includes an intermediate layer placed between the first and second layers and optimizing heat diffusion and making temperature uniform.

15. A fast bichromatic pyrometer according to claim 1, more particularly intended for measuring the temperature of gases, wherein the end of the measurement probe that receives the radiation is covered in a coating which confers black body type thermal emission thereto.

16. A fast bichromatic pyrometer according to claim 15, wherein said coating is constituted by a first layer that is highly emissive and by a second layer that is opaque to light and that is highly conductive.

17. A fast bichromatic pyrometer according to claim 16, wherein the coating further includes an intermediate layer placed between the first and second layers and optimizing heat diffusion and making temperature uniform.

18. A fast bichromatic pyrometer for measuring the temperature T of a surface and comprising:

an optical block placed facing the surface, picking up thermal radiation emitted by said surface and characteristic of its temperature, and comprising inlet focusing means that receive the emitted radiation, inlet collimation means for transmitting all of the received radiation, separation means formed by a dichroic slide for separating said radiation into two distinct spectral bands, and outlet focusing means for concentrating the separated bands of radiation;

a quantum detection circuit receiving said separated bands of radiation and converting them into two color voltages Vr, Vb;

converging means for approximating said color voltages Vr, Vb to substantially estimate the magnitude of said color voltages; and a treatment circuit receiving the voltage signals and including analog-to-digital conversion means, a digital signal processor for calculating the ratio Vr/Vb from these digital values, and memory means provided with a table of predetermined values T=f(Vr/Vb) as obtained by calibraition and delivering at its output, on the basis of the calculated ratio, the temperature T of the surface.

19. A fast bichromatic pyrometer according to claim 18, wherein each of the outlet focusing means for the separated bands of radiation is preceded by interference filter means.

20. A fast bichromatic pyrometer according to claim 18, wherein the focusing means comprise achromatic doublets.

21. A fast bichromatic pyrometer according to claim 18, wherein the treatment circuit further includes digital-to-analog conversion means placed at the output from the signal processor and designed to obtain an analog value of the measured temperature.

22. A fast bichromatic pyrometer according to claim 18, wherein the detection circuit includes two quantum detectors of the InGaAs type.

23. A fast bichromatic pyrometer according to claim 18, wherein the memory means comprise a flash type fast memory.

24. A fast bichromatic pyrometer according to claim 18, wherein the fast conversion means comprise two flash type analog-to-digital converters.

25. A fast bichromatic pyrometer according to claim 18, wherein the treatment circuit further includes means for matching the amplification levels of the signals Vr and Vb as a function of the orders of magnitude delivered to the processor by the fast converters.

26. A fast bichromatic pyrometer according to claim 25, wherein the means for adapting the amplification levels comprise, for each signal Vr or Vb, a multiplexer circuit having one input and at least two outputs receiving the signal and delivering it to one of at least two amplification circuits of different gains whose outputs are connected to a multiplexer circuit having at least two inputs and one output, a single amplification circuit being selected for each of the signals for each calculation of the ratio Vr/Vb.

27. A fast bichromatic pyrometer for measuring the temperature T of a gas or of a moving surface, the pyrometer comprising:

a measurement probe placed facing the surface or immersed in the gas and picking up thermal radiation that is characteristic of the temperature of said surface or of said gas;

a single optical fiber connected to the measurement probe and transmitting said radiation;

an optical block connected to the optical fiber and receiving said radiation, the optical block including inlet collimation means for transmitting all of said radiation, separation means formed by dichroic slide for separating the transmitted radiation into two distinct spectral bands, and outlet focusing means for concentrating the two separated bands of radiation;

a quantum detection circuit receiving said separated bands of radiation and converting them into two color voltages Vr, Vb;

converging means for approximating said color voltages Vr, Vb to substantially estimate the magnitude of said color voltages; and a treatment circuit receiving the voltage signals and including an analog divider receiving the signals Vr and Vb and delivering the ratio Vr/Vb to an analog-to-digital converter whose output is connected to a memory circuit that contains a table of values T=f(Vr/Vb) and that delivers the measured temperature T of the surface or the gas.

28. A method of measuring the temperature of a gas or of a moving surface by determining and treating thermal radiation characteristic of the temperature of said surface or of said gas, the method comprising the following steps:

1) picking up thermal radiation characteristic of the temperature of the surface or of the gas;

2) separating said radiation into two distinct spectrum bands of radiation;

3) converting the two bands of radiation into two color voltages Vr and Vb;

4) converging the values of color voltages Vr and Vb whereby the dynamic range of the signals Vr and Vb is modified by an amplification circuit determined for each signal substantially as a function of the order of magnitude of said signal;

5) calculating the ratio thereof Vr/Vb; and 6) extracting the correspondence value of the measured temperature T from a conversion table T=f(Vr/Vb) that has previously been determined by calibration.

29. A fast bichromatic pyrometer for measuring the temperature T of a surface, the pyrometer comprising:

an optical block placed facing the surface and receiving said radiation, the optical block including inlet collimation means for transmitting all of said radiation, separation means formed by dichroic slide for separating the transmitted radiation into two distinct spectral bands, and outlet focusing means for concentrating the two separated bands of radiation;

a quantum detection circuit receiving said separated bands of radiation and converting them into two color voltages Vr, Vb;

converging means for approximating said color voltages Vr, Vb to substantially estimate the magnitude of said color voltages; and a treatment circuit receiving the voltage signals and including an analog divider receiving the signals Vr and Vb and delivering the ratio Vr/Vb to an analog-to-digital converter whose output is connected to a memory circuit that contains a table of values T=f(Vr/Vb) and that delivers the measured temperature T of the surface.

30. A fast bichromatic pyrometer for measuring the temperature T of a gas or a moving surface, the pyrometer comprising:
- a measurement probe placed facing the surface or immersed in the gas and picking up thermal radiation that is characteristic of the temperature of said surface or of said gas;
- a single optical fiber connected to the measurement probe and transmitting said radiation;
- an optical block connected to the optical fiber and receiving said radiation, the optical black including inlet collimation means for transmitting all of said radiation, separation means formed by a dichroic slide for separating the transmitted radiation into two distinct spectral bands, and outlet focusing means for concentrating the two separated bands of radiation;
- a quantum detection circuit receiving said separated bands of radiation and converting them into two color voltages Vr, Vb; and
- a treatment circuit receiving the voltage signals and including analog-to-digital conversion means, a digital signal processor for calculating the ratio Vr/Vb from these digital values, and memory means provided with a table of predetermined values of T=f(Vr/Vb) as obtained by calibration and delivering at its output, on the basis of the calculated ratio, the temperature T of the surface or of the gas, wherein the end of the measurement probe that receives radiation from the surface includes a hemispherical cap whose radius is determined as a function of the distance to the surface.

31. A fast bichromatic pyrometer according to claim 30, more particularly intended for measuring the temperature of gases, wherein the end of the measurement probe that receives the radiation is covered in a coating which confers black body type thermal emission thereto.

32. A fast bichromatic pyrometer according to claim 31, wherein said coating is constituted by a first layer that is highly emissive and by a second layer that is opaque to light and that is highly conductive.

33. A fast bichromatic pyrometer according to claim 32, wherein the coating further includes an intermediate layer placed between the first and second layers and optimizing heat diffusion and making temperature uniform.

34. A fast bichromatic pyrometer for measuring the temperature T of a gas or of a moving surface, the pyrometer comprising:
- a measurement probe placed facing the surface or immersed in the gas and picking up thermal radiation that is characteristic of the temperature of said surface or of said gas;
- a signal optical fiber connected to the measurement probe and transmitting said radiation;
- an optical block connected to the optical fiber and receiving said radiation, the optical block including inlet collimation means for transmitting all of said radiation, separation means formed by a dichroic slide for separating the transmitted radiation into two distinct spectral bands, and outlet focusing means for concentrating the two separated bands of radiation;
- a quantum detection circuit receiving said separated bands of radiation and converting them into two color voltages Vr, Vb; and
- a treatment circuit receiving the voltage signals and including analog-to-digital conversion means, a digital signal processor for calculating the ration Vr/Vb from these digital values, and memory means provided with a table of predetermined values of T=f(Vr/Vb) as obtained by calibration and delivering at its output, on the basis of the calculated radio, the temperature T of the surface or of the gas, wherein the end of the measurement probe that receives the radiation is covered in a coating which confers black body type thermal emission thereto.

35. A fast bichromatic pyrometer according claims 34, wherein said coating is constituted by a first layer that is highly emissive and by a second layer that is opaque to light and that is highly conductive.

36. A fast bichromatic pyrometer according claims 35, wherein the coating further includes an intermediate layer placed between the first and second layers and optimizing heat diffusion and making temperature uniform.

* * * * *